US012573692B2

(12) United States Patent
Gray et al.

(10) Patent No.: US 12,573,692 B2
(45) Date of Patent: Mar. 10, 2026

(54) BATTERY CONNECTOR PLATE WITH ELECTROMAGNETIC SHIELD

(71) Applicant: Ford Global Technologies, LLC, Dearborn, MI (US)

(72) Inventors: Ryan Scott Gray, Farmington Hills, MI (US); Alexander Robert Rink, Royal Oak, MI (US); Michael Barr, Canton, MI (US); Nathaniel Conti, Canton, MI (US); Nicholas Patino, Okemos, MI (US); Nicholas Braeseker, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 786 days.

(21) Appl. No.: 17/900,410

(22) Filed: Aug. 31, 2022

(65) Prior Publication Data

US 2024/0072342 A1     Feb. 29, 2024

(51) Int. Cl.
H01M 50/14 (2021.01)
H01M 50/593 (2021.01)

(52) U.S. Cl.
CPC ......... H01M 50/14 (2021.01); H01M 50/593 (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 5,070,216 A | 12/1991 | Thornton | |
| 5,565,656 A | 10/1996 | Mottahed | |
| 5,566,055 A | 10/1996 | Salvi, Jr. | |
| 5,847,938 A | 12/1998 | Gammon | |
| 6,255,581 B1 | 7/2001 | Reis et al. | |
| 2002/0014748 A1 | 2/2002 | McCullough et al. | |
| 2004/0172502 A1 | 9/2004 | Lionetta et al. | |
| 2006/0012969 A1 | 1/2006 | Bachman | |
| 2012/0285738 A1 | 11/2012 | Cochrane et al. | |
| 2016/0141584 A1* | 5/2016 | Eichorn | B60R 16/033 439/571 |
| 2016/0270270 A1 | 9/2016 | Madsen et al. | |
| 2019/0074697 A1* | 3/2019 | Lee | G01R 31/3835 |
| 2021/0399501 A1* | 12/2021 | Balana Avila | H01M 50/287 |

* cited by examiner

*Primary Examiner* — Alix E Eggerding
(74) *Attorney, Agent, or Firm* — Burris Law, PLLC

(57) ABSTRACT

A battery component includes a header body and a frame secured to the header body. The frame includes an electromagnetic shield portion. The electromagnetic shield portion defines at least one electrical connection port. The electrical connection port is configured to receive an electrically conductive object. The electromagnetic shield portion is configured to dissipate electromagnetic radiation from the electrically conductive object.

20 Claims, 7 Drawing Sheets

BATTERY CONNECTOR PLATE WITH ELECTROMAGNETIC SHIELD

FIELD

The present disclosure relates to battery assemblies, and more particularly to electrically shielding high voltage from batteries in electric vehicles.

BACKGROUND

The statements in this section merely provide background information related to the present disclosure and may not constitute prior art.

The desire to reduce automotive fuel consumption and emissions has been well documented. Thus, electric vehicles (EVs) have been developed to significantly reduce reliance on internal combustion engines. In general, electric vehicles differ from conventional motor vehicles because they are driven by one or more rechargeable battery assemblies having lithium-ion batteries, for example, or any other suitable electrical power storage units. The battery assembly typically powers one or more motors to drive a set of wheels.

The battery assembly further includes one or more shielded connectors that inhibit radio frequency (RF) electromagnetic radiation (EMR) from wires or other electrically conductive components within the battery assembly. Such EMR should be contained or shielded in order to inhibit interference with external devices. Known EMR shields, however, are typically a metal material and thus can add significant weight to an EV and are also prone to corrosion.

The present disclosure addresses these and other issues related to shielding external devices from EMR generated by rechargeable battery assemblies in electric vehicles.

SUMMARY

This section provides a general summary of the disclosure and is not a comprehensive disclosure of its full scope or all of its features.

In one form, a battery component includes a header body and a frame secured to the header body, the frame including an electromagnetic shield portion, the electromagnetic shield portion defining at least one electrical connection port, wherein the electrical connection port is configured to receive an electrically conductive object, and the electromagnetic shield portion is configured to dissipate electromagnetic radiation from the electrically conductive object.

In variations of the battery component, which may be implemented individually or in combination: the battery component further includes a plurality of electrically conductive fasteners securing the frame to the header body; an electrical ground, wherein the electrically conductive fasteners electrically connect the frame to the electrical ground; the frame defines an opening adjacent to the electromagnetic shield portion; further including a seal secured to and extending around a perimeter of the frame; the electromagnetic shield portion is continuous between opposing peripheral edges of the frame; the body is a polymeric material; the body includes an integral electrical connector protruding through the electrical connection port of the frame; the electrical connection port extends through the body; the electromagnetic shield portion defines a second electrical connection port adjacent to the electrical connection port.

In another form, a battery assembly includes a battery tub, an electrically conductive object external to the battery tub, and a battery header secured to the battery tub, the battery header including a body, and a frame secured to the body, the frame including an electromagnetic shield portion, the electromagnetic shield portion defining an electrical connection port, wherein the electromagnetic shield portion is configured to dissipate electromagnetic radiation from the electrically conductive object to the battery tub.

In variations of the battery assembly, which may be implemented individually or in combination: the battery further includes a plurality of electrically conductive fasteners securing the frame to the battery tub; the plurality of electrically conductive fasteners form an electrical connection between the electrically conductive object and the battery tub; the frame defines an opening adjacent to the electromagnetic shield portion; further including a seal secured to and extending around a perimeter of the frame.

In another form, a vehicle subassembly includes a vehicle frame member, a battery tub supported by the vehicle frame member, an electrically conductive object external to the battery tub, and a battery header secured to the battery tub, the battery header including a body and a frame secured to the body, the frame including an electromagnetic shield portion, the electromagnetic shield portion defining an electrical connection port, wherein the electromagnetic shield portion is configured to dissipate electromagnetic radiation from the electrically conductive object to the vehicle frame member via the battery tub.

In variations of the vehicle subassembly, which may be implemented individually or in combination: the vehicle subassembly further includes a plurality of electrically conductive fasteners securing the frame to the battery tub, the plurality of electrically conductive fasteners forming an electrical connection between the electromagnetic shield portion and the frame member; wherein the vehicle frame member forms an electrical ground, and the electromagnetic shield portion dissipates the electromagnetic radiation from the electrically conductive object to the electrical ground; wherein the vehicle frame member is a longitudinal frame rail; further including a seal secured to and extending around a perimeter of the frame.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
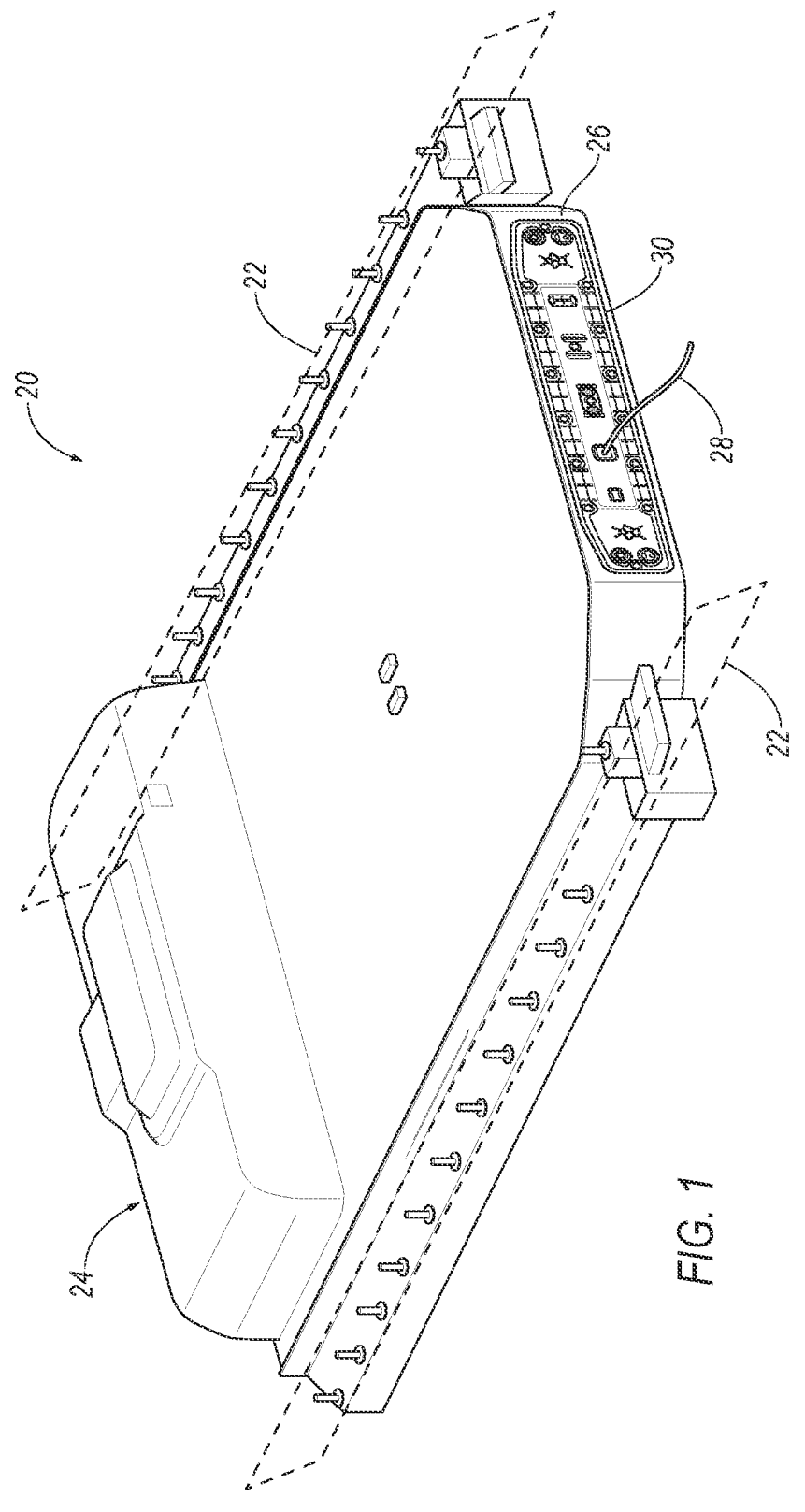
FIG. 1 is a perspective view of a battery assembly according to the present disclosure.
Figure 2:
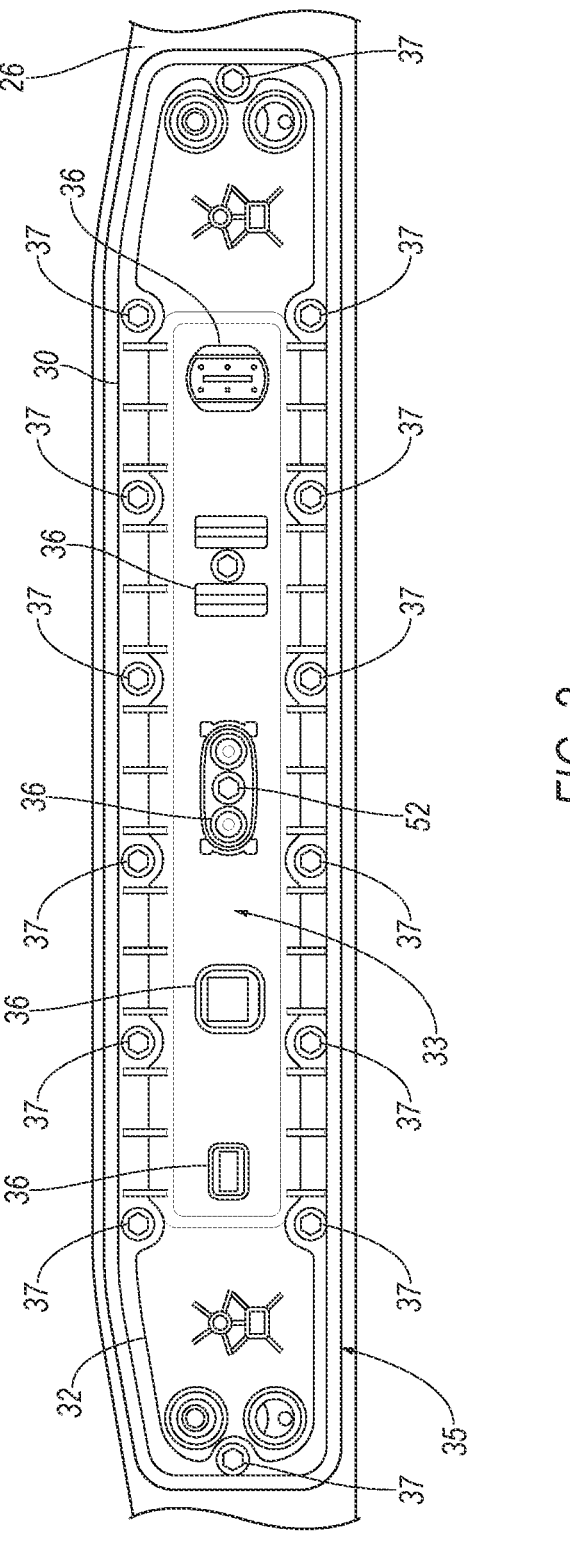
FIG. 2 is a front view of a battery header of a battery assembly according to the present disclosure.
Figure 3:
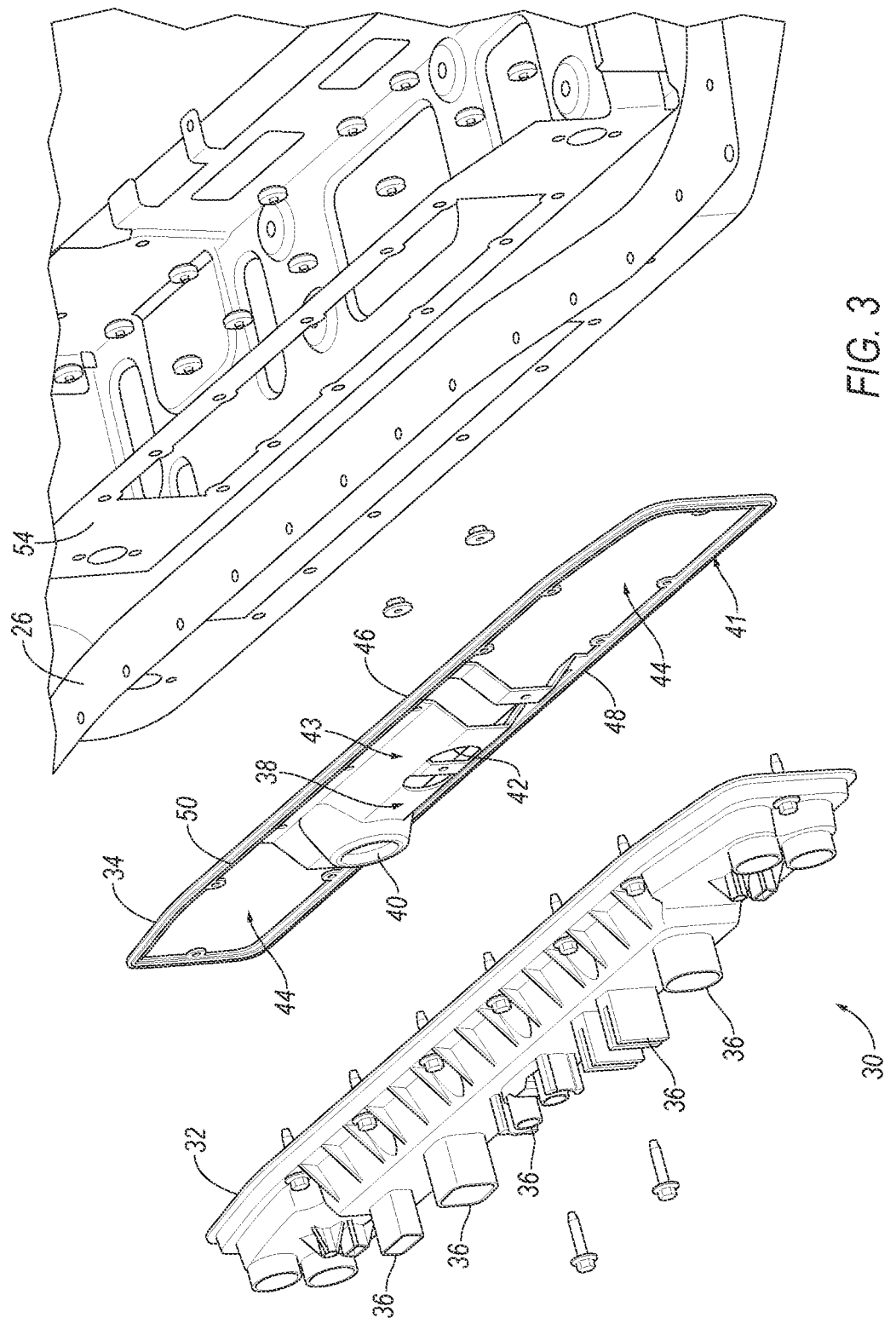
FIG. 3 is an exploded front perspective view of the battery header and battery tub of the battery assembly according to the present disclosure.
Figure 4:
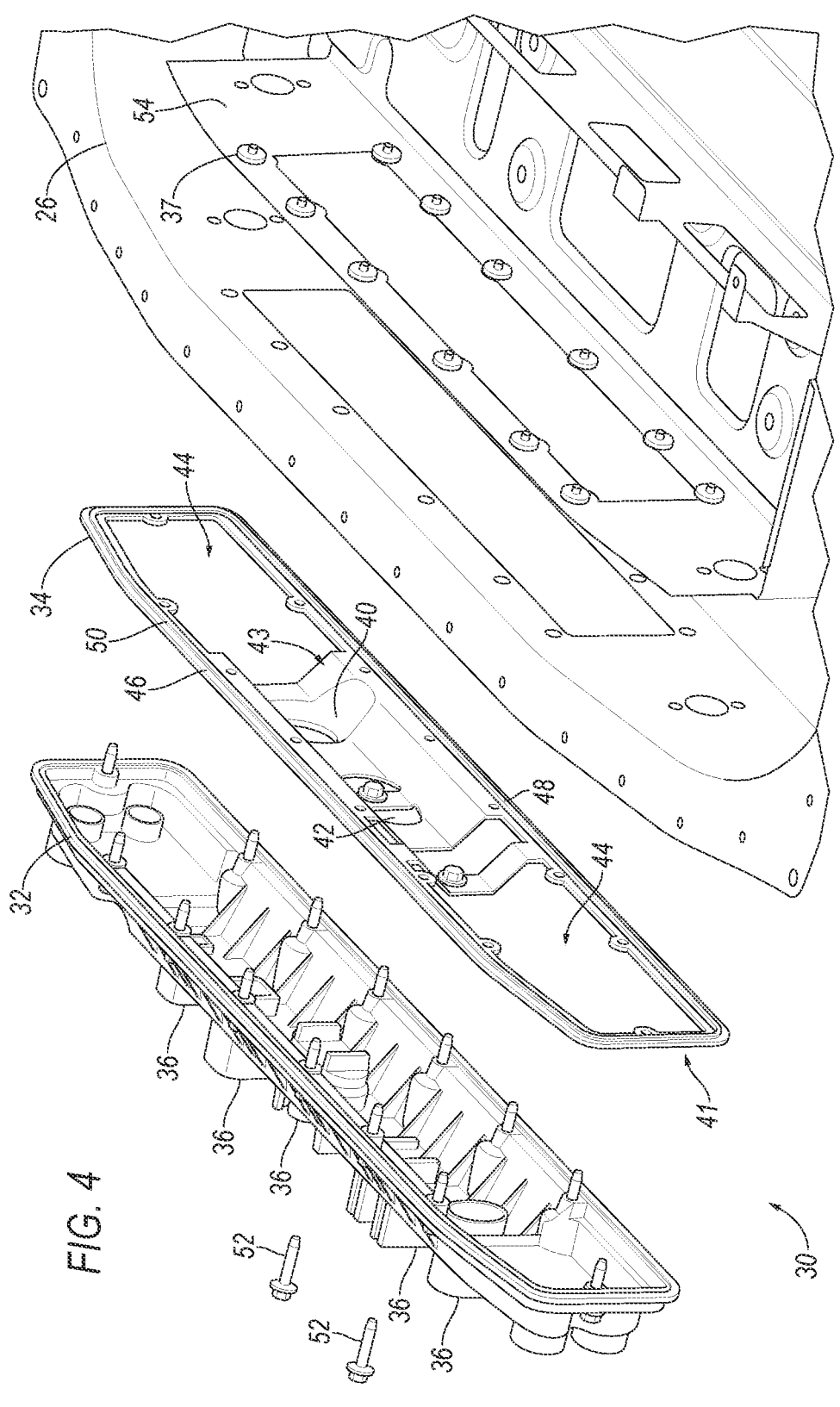
FIG. 4 is an exploded rear perspective view of the battery header and the battery tub of the battery assembly according to the present disclosure.
Figure 5:
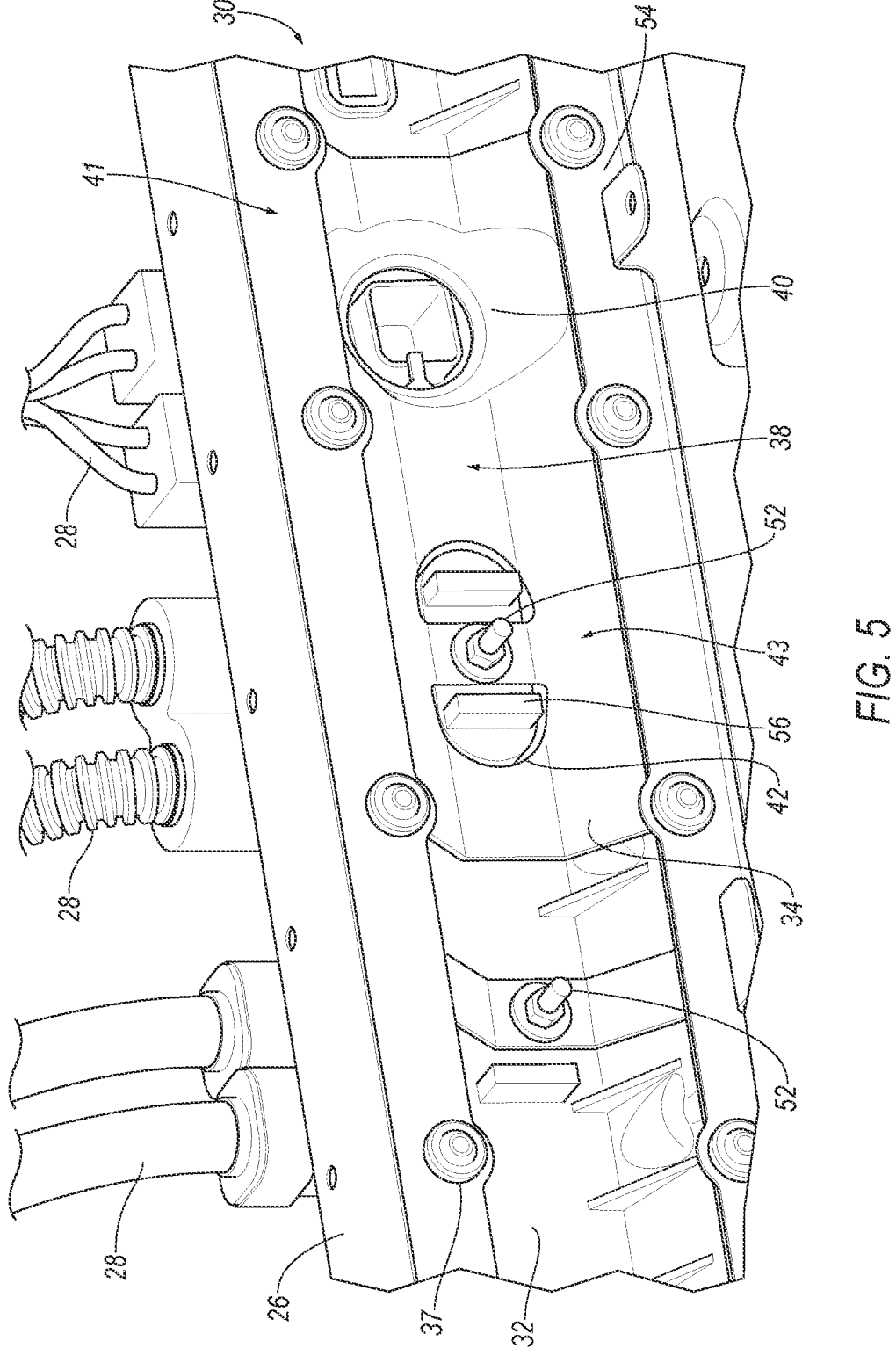
FIG. 5 is an enlarged rear perspective view of the battery header installed to the battery tub according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle subassembly 20 for an electric vehicle is shown. The vehicle subassembly 20 includes opposed frame members 22, configured to be mounted to a vehicle chassis (not shown for purposes of clarity), and a battery assembly 24 supported by the frame members 22. In one form, the vehicle is a body-on-frame vehicle architecture and the frame members 22 are the longitudinal side rails of the structural frame of the vehicle and may extend substantially parallel to each other along opposite lateral sides of the battery assembly 24. The battery assembly 24 includes a battery tub 26, a battery header 30 secured to the battery tub 26, and a battery pack (not shown) within the battery tub 26. An electrically conductive object 28 such as a powered wire (as shown) or bus tab (not shown) can be attached or mounted to the battery header 30. The battery tub 26 houses the battery pack (not shown), which may include one or more battery cells (not shown) among other components (e.g., circuitry associated with the battery cells) as described in greater detail below. In the form shown, the electrically conductive object 28 conducts power from the battery to one or more components of the electric vehicle, such as an electric motor. The header 30 generally provides (or functions to provide) a mechanical connection for and locates each of the electrically conductive objects 28.

Referring now to FIGS. 2-6, the battery header 30 in one form includes a body 32 and a frame 34. The frame 34 in this form is a separate part or component that is secured to the body 32. In this form, the body 32 is the outermost structure of the battery header 30, such that the frame 34 is between the body 32 and the battery tub 26. The body 32 includes a wall portion 33, a flange portion 35, and one or more external electrical connector 36.

The flange portion 35 defines a perimeter of the body 32 and couples the body 32 to the battery tub 26. In the example provided, the flange portion 35 is attached to the battery tub 26 by fasteners 37 (e.g., bolts or screws), though other configurations can be used, such as interlocking features or clips for example. The wall portion 33 extends inward, relative to the perimeter defined by the flange portion 35, from the flange portion 35 to the connector 36. The wall portion 33 can support the connector 36 to space the connector 36 apart from the flange portion 35 and the battery tub 26.

The connector 36 provide electrical connection from the battery pack (not shown) to the electrically conductive objects 28. The electrical connector 36 can be shaped to receive mating electrical connectors 39 (one shown in FIG. 6), which can support the electrically conductive object 28, such as wires and/or bus tabs.

The body 32 can be any suitable non-electrically conductive material, such as a polymeric material or a composite material, for example. Specifically, the body 32 may be formed by injection molding, by way of example, such that the electrical connector 36 are integrally formed with the wall portion 33 and the flange portion 35. In another form, the body is formed by an additive manufacturing process, such as fused filament fabrication.

The frame 34 includes a flange portion 41, at least one wall portion 43, and at least one electromagnetic shield portion 38. The flange portion 41 defines a perimeter of the frame 34. The flange portion 41 couples the frame 34 to the battery tub 26 and is disposed between the flange portion 35 and the battery tub 26. In the example provided, the flange portion 41 is attached to the battery tub 26 by the fasteners 37, though other configurations can be used, such as interlocking features or clips for example.

The wall portion 43 extends inward, relative to the perimeter defined by the flange portion 41, from the flange portion 41 to the electromagnetic shield portion 38. The wall portion 43 can support the electromagnetic shield portion 38 to space the electromagnetic shield portion 38 apart from the flange portion 41 and the battery tub 26.

The electromagnetic shield portion 38 defines at least one aperture or connection port aligned with a corresponding one of the connector 36. In the example provided, the electromagnetic shield portion 38 defines a first aperture or connection port 40 aligned with one of the connector 36 and a second aperture or connection port 42 aligned with a second one of the connector 36, though other configurations can be used. The connection ports (e.g., 40, 42) are large enough for electrical conductors (e.g., pin 45, shown in FIG. 6) to extend through the frame 34, into the connector 36, where the conductor (e.g., pin 45) can electrically couple with the electrically conductive object 28 (e.g., via a mating pin 47 of the mating electrical connector 39). The conductor (e.g., pin 45) is electrically connected to the battery pack (not shown).

The connection ports (e.g., 40, 42) defined by the electromagnetic shield portion 38 are large enough such that the conductor (e.g., pin 45) does not contact the frame 34 and large enough to prevent electrical arcing between the conductor (e.g., pin 45) and the frame 34. However, the connection ports (e.g., 40, 42) are small enough such that the electromagnetic shield portion 38 still overlaps a rear side (i.e., interior side) of the connector 36. In one form, the electromagnetic shield portion 38 may abut the rear side of the connector 36.

In one form, the frame 34 is metal. The frame 34 may optionally be formed from sheet metal stamped into a three-dimensional shape. In another form, the frame 34 may be formed by another method, such as welding, soldering, fastening, adhesive bonding, or additive manufacturing, for example. While the frame 34 is metal in one form, it should be understood that the frame 34 can be any electrically conductive material within the scope of the present disclosure, such as an electrically conductive composite material. The electromagnetic shield portion 38 and the wall portion 43 provide continuous electrical continuity from opposing peripheral edges of the flange portion 41, such as between a top edge 46 and a bottom edge 48 of the flange portion 41. Because electricity flowing between the battery pack (not shown) and the electrically conductive object 28 causes electromagnetic radiation (EMR) to be emitted, the metal electromagnetic shield portion 38 surrounding the conductor (e.g., pin 45) is configured to dissipate the EMR to an electrical ground since the frame 34 provides electrical continuity to the electrical ground, as described in greater detail below.

As further shown, the frame 34 can define one or more openings 44 adjacent to the electromagnetic shield portion 38. These openings 44 can be larger than the connection ports (e.g., 40, 42) defined by the electromagnetic shield portion 38 and are configured to reduce the overall weight of the frame 34 in areas where shielding is not required and/or where structure is required for any other functional purpose. In one form, these openings make up a majority of the geometric area encompassed by the flange portion 41.

In one form, the battery header 30 also includes a seal 50, which in one form is a gasket, secured to and extending around the flange portion 41 of the frame 34. The seal 50 is configured to form a fluid-tight barrier between the flange portion 41, the flange portion 35, and the battery tub 26 when the battery header 30 is secured to the battery tub 26. In one form, the seal 50 is co-molded, or over-molded, to the frame 34 in an injection molding process. In another form, the seal 50 is formed separately and then attached to the frame 34 in a suitable manner, such as with an adhesive, or interlocking geometry. In another form, not specifically shown, one seal is disposed between the flange portion 41 and the battery tub 26, while a separate seal is disposed between the flange portion 41 and the flange portion 35.

In addition to the fasteners 37, which can secure the flange portion 41 to the flange portion 35, additional fasteners 52 may secure the electromagnetic shield portion 38 to the body 32 and may secure the connector 36 to the mating electrical connector 39. The fastener 52 may optionally also be electrically conductive (e.g., metal) to provide grounding electrical continuity between the electromagnetic shield portion 38 and part of the mating electrical connector 39.

In one form, at least one of the fasteners 37 is electrically conductive and provides electrical continuity between the frame 34 and the battery tub 26, and the battery tub 26 is electrically connected to an electrical ground (e.g., frame members 22, shown in FIG. 1). EMR emitted at the connector 36 is transferred to the electromagnetic shield portion 38, through the electrically conductive fasteners 37, to the battery tub 26, and then to the electrical ground. Thus, the electrically conductive fasteners 37 provide an electrical grounding path from the electromagnetic shield portion 38 to an electrical ground.

The battery tub 26 can also include an internal tray 54. The battery header 30 can be secured to the internal tray 54 by the fasteners 37. The internal tray 54 generally houses one or more electrically conductive objects (not shown), such as wire bundles and bus tabs/bars, as well as other components of the battery, such as electrical connectors (not shown) or battery cells (not shown). In another form not shown, the battery tub 26 lacks the internal tray 54.

Figure 6:
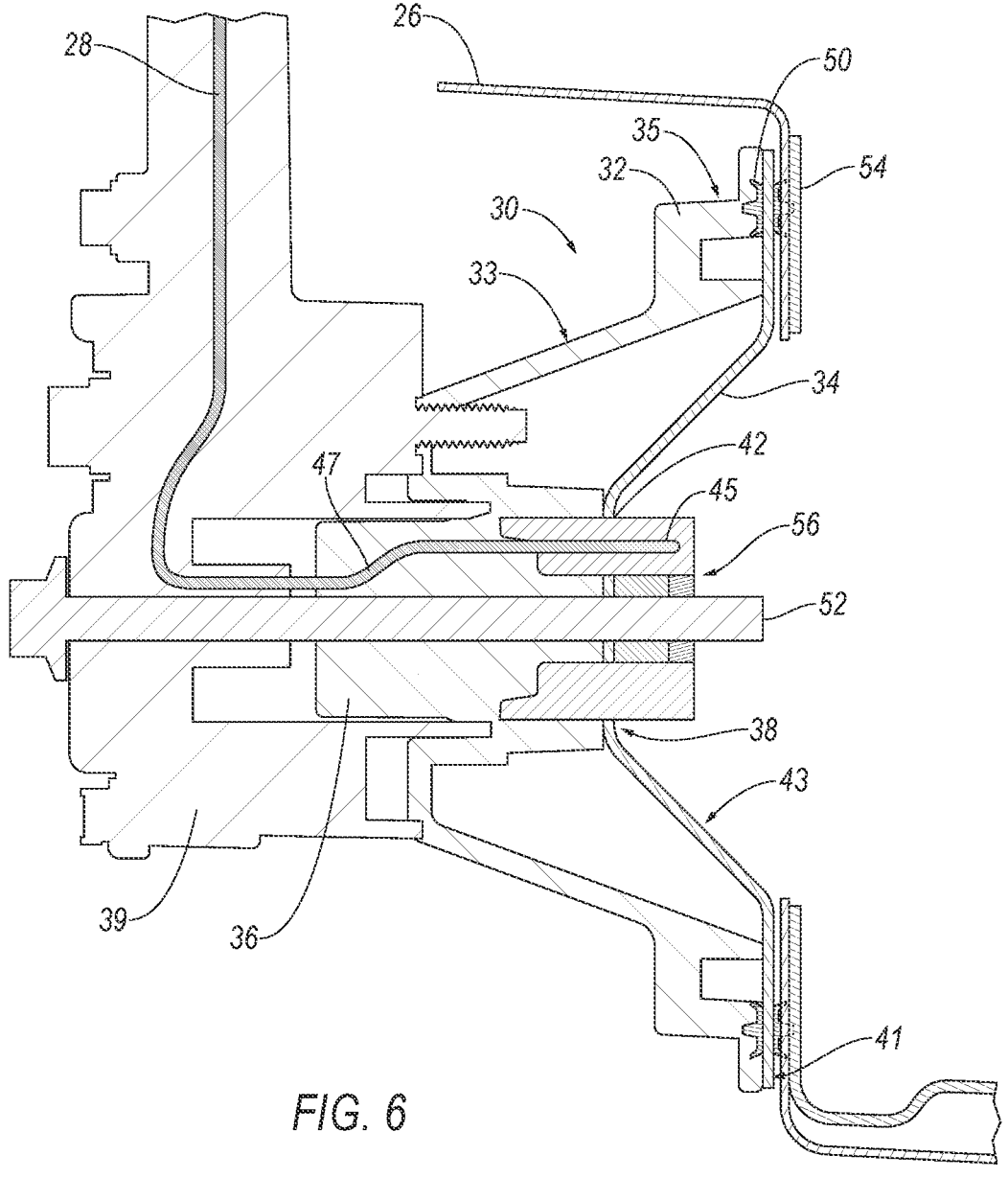
FIG. 6 is a side cross-sectional view of the battery assembly according to the present disclosure.

With reference to FIG. 6, an internal electrical connector 56 can be attached to an end of a cable (similar to cable 60 shown in FIG. 7) that extends into the battery tub 26 and the cable is attached to components of the battery therein. The internal electrical connector 56 can include the electrical conductor (e.g., pin 45) and couples the conductor (e.g., pin 45) to the cable. The internal electrical connector 56 protrudes through the connection port (e.g., connection port 42) of the frame 34, and is received in the rear side of the connector 36 to position the conductor (e.g., pin 45) therein for connection with the mating pin 47. The internal electrical connector 56 may be removably coupled to the connector 36, such as via clips (similar to clips 57, shown in FIG. 7). The internal electrical connector 56 can electrically insulate the conductor (e.g., pin 45) from the frame 34 and the fastener 52.

Figure 7:
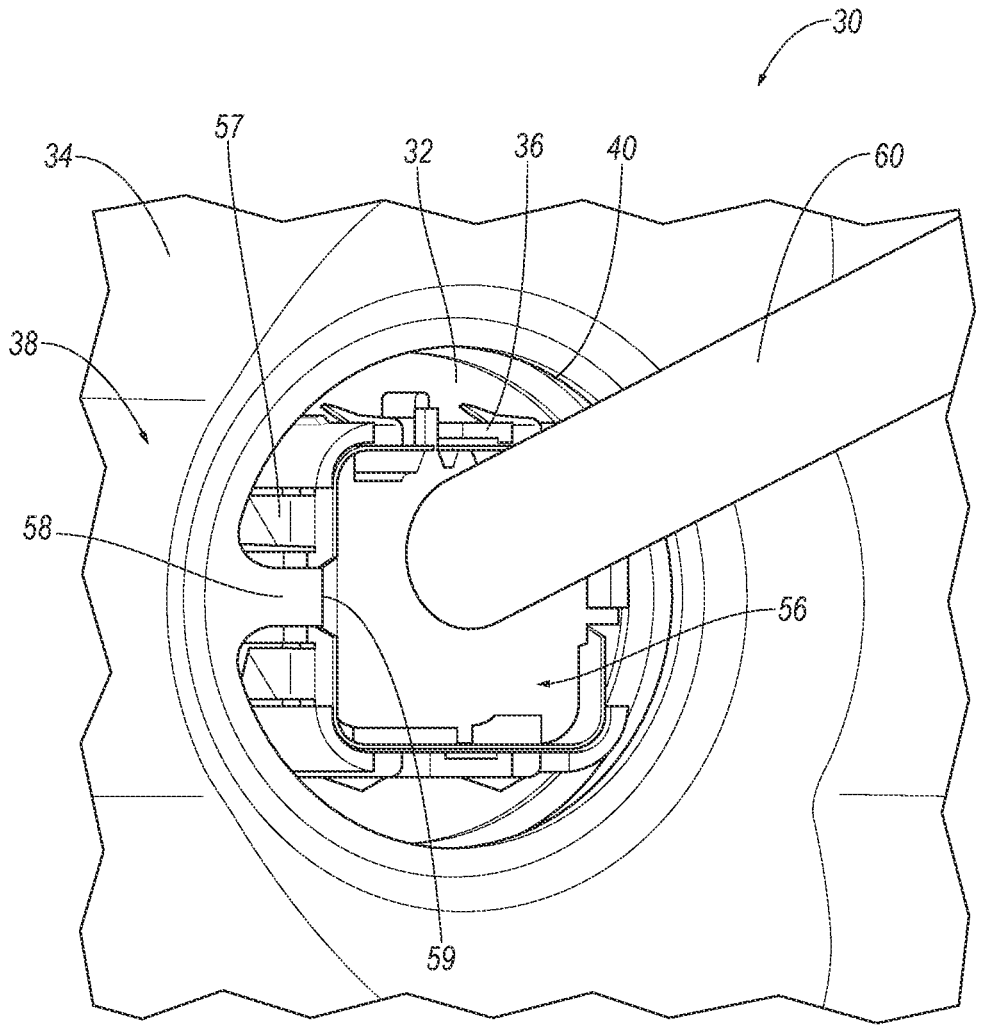
FIG. 7 is an enlarged view of a connection port of the battery header with an electrically conductive object disposed therein according to the present disclosure.

Referring to FIG. 7, a rear side of the battery header 30 at the connection port 40 is shown. The connector 36 shown in FIG. 7 can be similar to the connector 36 shown in FIG. 6 and described above, except as otherwise shown or described herein. Accordingly, similar features have similar reference numerals and only differences are described in detail herein. Specifically, the connector 36 shown in FIG. 7 does not include the fastener 52. Instead, the electromagnetic shield portion 38 includes a tab 58 that electrically connects to a grounding contact 59 of the internal electrical connector 56. The electrical connection, formed by physical contact between the tab 58 and the grounding contact 59 of the internal electrical connector 56 dissipates EMR to the electrical ground, as described above. That is, the frame 34, via the tab 58, forms the electrical path from the internal electrical connector 56 to the electrical ground.

By reducing the amount of material used to form the frame 34 and incorporating a lighter weight material, such as a polymer into the body 32, the overall weight of the battery header 30 is reduced while providing EMR shielding. Such shielding reduces interference with components that use electromagnetic frequencies to communicate, such as by way of example, a radio or other electronic controls within the vehicle. The battery header 30 of the present disclosure thus improves operation of the vehicle by reducing the overall weight of the battery assembly, thereby increasing the energy efficiency of the vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery component comprising:
   a header body; and
   a frame secured to the header body, the frame including a periphery and an electromagnetic shield portion, the electromagnetic shield portion extending from a first side of the periphery towards a second side of the periphery and defining at least one electrical connection port,
   wherein the electrical connection port is configured to receive an electrically conductive object, and the electromagnetic shield portion is configured to dissipate electromagnetic radiation from the electrically conductive object.

2. The battery component of claim 1, further comprising a plurality of electrically conductive fasteners securing the frame to the header body.

3. The battery component of claim 2, further comprising an electrical ground, wherein the electrically conductive fasteners electrically connect the frame to the electrical ground.

4. The battery component of claim 1, wherein the frame defines an opening adjacent to the electromagnetic shield portion.

5. The battery component of claim 1, further comprising a seal secured to and extending around a perimeter of the frame.

6. The battery component of claim 1, wherein the first side of the periphery and the second side of the periphery are opposite of each other, and wherein the electromagnetic shield portion is continuous between the first side of the periphery and the second side of the periphery.

7. The battery component of claim 1, wherein the header body is a polymeric material.

8. The battery component of claim 1, wherein the body includes an integral electrical connector protruding through the electrical connection port of the frame.

9. The battery component of claim 1, wherein the electrical connection port extends through the header body.

10. The battery component of claim 1, wherein the electromagnetic shield portion defines a second electrical connection port adjacent to the electrical connection port.

11. A battery assembly, comprising:
a battery tub;
an electrically conductive object external to the battery tub; and
a battery header secured to the battery tub, the battery header comprising:
a body; and
a frame secured to the body, the frame including a periphery and an electromagnetic shield portion, the electromagnetic shield portion extending from a first side of the periphery towards a second side of the periphery and defining an electrical connection port, wherein the electromagnetic shield portion is configured to dissipate electromagnetic radiation from the electrically conductive object to the battery tub.

12. The battery assembly of claim 11, further comprising a plurality of electrically conductive fasteners securing the frame to the battery tub.

13. The battery assembly of claim 12, wherein the plurality of electrically conductive fasteners form an electrical connection between the electrically conductive object and the battery tub.

14. The battery assembly of claim 11, wherein the frame defines an opening adjacent to the electromagnetic shield portion.

15. The battery assembly of claim 11, further comprising a seal secured to and extending around a perimeter of the frame.

16. A vehicle subassembly, comprising:
a vehicle frame member;
a battery tub supported by the vehicle frame member;
an electrically conductive object external to the battery tub; and
a battery header secured to the battery tub, the battery header comprising:
a body; and
a frame secured to the body, the frame including a periphery and an electromagnetic shield portion, the electromagnetic shield portion extending from a first side of the periphery towards a second side of the periphery and defining an electrical connection port, wherein the electromagnetic shield portion is configured to dissipate electromagnetic radiation from the electrically conductive object to the vehicle frame member via the battery tub.

17. The vehicle subassembly of claim 16, further comprising a plurality of electrically conductive fasteners securing the frame to the battery tub, the plurality of electrically conductive fasteners forming an electrical connection between the electromagnetic shield portion and the frame member.

18. The vehicle subassembly of claim 16, wherein the vehicle frame member forms an electrical ground, and the electromagnetic shield portion dissipates the electromagnetic radiation from the electrically conductive object to the electrical ground.

19. The vehicle subassembly of claim 16, wherein the vehicle frame member is a longitudinal frame rail.

20. The vehicle subassembly of claim 16, further comprising a seal secured to and extending around a perimeter of the frame.

* * * * *